United States Patent
Wallack

[19]

[11] Patent Number: 6,055,550

[45] Date of Patent: *Apr. 25, 2000

[54] AUTO SIZING OF FIELDS FOR DISPLAYING COMPUTER FORMS

[75] Inventor: Peter Wallack, Sunnyvale, Calif.

[73] Assignee: Oracle Corporation, Redwood Shores, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/618,848

[22] Filed: Mar. 21, 1996

[51] Int. Cl.[7] ................................................... G06F 17/25
[52] U.S. Cl. ........................ 707/509; 707/518; 707/508
[58] Field of Search ........................... 395/766, 768, 395/769, 770, 771, 780, 781, 782, 783, 340, 342; 345/55, 59, 340, 342; 707/508, 505, 506, 507, 509, 510, 518, 519, 520, 521

[56] References Cited

U.S. PATENT DOCUMENTS 5,450,536  9/1995  Rosenberg et al. ...................... 395/770
5,450,538  9/1995  Glaser et al. ............................ 395/769
5,588,099  12/1996 Mogilevsky et al. .................... 395/139
5,632,009  5/1997  Rao et al. ................................ 395/770

OTHER PUBLICATIONS

*Microsoft® Office 6–in–1*, New Edition, Que Corporation, 1994, pp. 262, 280 and 325–328, 355–364.

*Primary Examiner*—Stephen S. Hong
*Attorney, Agent, or Firm*—Stattler, Johansen & Adeli, LLP

[57] ABSTRACT

An auto resizing of fields system is disclosed that permits resizing a selected group of cells on a computer generated form. The selected group of cells are aligned, such as in a column, on a computer generated form. Data for the computer form is contained on records that may be stored at remote data sources. To auto size a selected group of cells, sample records are selected, and for each record selected, a display size large enough to display data without obstruction in the corresponding cell is calculated. From the display sizes calculated, a single optimal size for all cells in the group of cells is determined. Based on the optimal size, the group of cells are resized, and additional cells, which are visible on the computer generated form, are also resized to reflect the resizing of the group of cells. A technique for calculating an optimal width for a selected column on a form is also disclosed.

19 Claims, 5 Drawing Sheets

| Customer Name | Order Handling Instructions | Customer Status | Accounts Receivable | Orders Placed |
|---|---|---|---|---|
| Alpha | Send immediate | Preferred | $20,000  30 | 217210 |
| Beta | Ship all orders C | Regular | $5,000  60 | 176100 |
| Charlie | None | Regular | $0 | 227601 |
| Delta | Mark with order | Preferred | $11,000 | 279171 |

FIG. 1

Menu Bar

| File | Edit | View Tools | | |
|------|------|-----------|---|---|
| Customer Name | *Auto Size* | Customer Status | Accounts Receivable | Orders Placed |
| Alpha | | Preferred | $20,000  30 | 217210 |
| Beta | Ship all orders C | Regular | $5,000  60 | 176100 |
| Charlie | None | Regular | $0 | 227601 |
| Delta | Mark with order | Preferred | $11,000 | 279171 |

FIG. 3A

| Customer Name | Order Handling Instructions | Customer Status | Accounts Receivable | Orders Placed |
|---|---|---|---|---|
| Alpha | Se | | 30 | 217210 |
| Beta | Sh | | 60 | 176100 |
| Charlie | Nc | | | 227601 |
| Delta | Ma | | | 279171 |

Column Select

Sampling Information
Sample Record ☐
# of Records ☐
Random Sampling ☐

FIG. 3B

| Customer Name | Order Handling Instructions | Customer Status | Accounts Receivable | | Ord |
|---|---|---|---|---|---|
| Alpha | Send immediate notification if in stock | Preferred | $20,000 | 30 | 217 |
| Beta | Ship all orders C.O.D. | Regular | $5,000 | 60 | 176 |
| Charlie | None | Regular | $0 | | 227 |
| Delta | Mark with order number | Preferred | $11,000 | | 279 |

AUTO SIZING OF FIELDS FOR DISPLAYING COMPUTER FORMS

BACKGROUND OF THE INVENTION

1. Field of the Invention

The present invention is directed toward the field of displaying data on a computer display, and more particularly to optimizing the display of data for a computer generated form.

2. Art Background

For certain applications, computers generate forms and spreadsheets for display on an output display. The forms and spreadsheets are used in a variety of applications to communicate information that relates to the underlying applications program. Typically, the information is arranged in fields on the form or spreadsheet to partition or organize the data. For example, a spreadsheet contains rows and columns that form a matrix. Each row indicates a record or an entry, and each column represents a particular calculation or category for one or more of the records. For example, each record may identify a customer, and each column may identify a particular attribute of the customer.

FIG. 1 illustrates an example computer generated form for output on a computer display. As shown in FIG. 1, the spreadsheet is partitioned into a number of rows and columns. The example spreadsheet shown in FIG. 1 displays information for a customer order system. As shown in the example spreadsheet in FIG. 1, each row corresponds to a customer (e.g. "Alpha", "Beta", "Charlie", "Delta", etc.). Each column includes a specific attribute about the customer in the corresponding row. For this example, the columns indicate "Order Handling Instructions", "Customer Status", "Accounts Receivable", and "Orders Placed." A field or cell is formed at the intersection of each row and column. The field displays data corresponding to the attribute of the column and the record of the row. The matrix of columns and rows in the spreadsheet provides a convenient form for displaying customer order information about a number of different customers.

Typically, the computer generated forms and spreadsheets include static field sizes in that a designer of the form sets specific widths and heights for the fields. This static approach requires the designer of the form to anticipate the amount of data to accommodate display of the data in the fixed sized field. As shown in FIG. 1, the column labeled "Order Handling Instructions" contains text that does not fully render within the field. For example, for the "Alpha" entry field of the "Order Handling Instructions" column, the text "Send immediate notification as to whether item ordered is currently in stock" does not completely fit in the pre-defined field size. To display all of the characters in the fixed size field, a designer must know the length of the text for the record in order to successfully display all of the text without obstruction. Furthermore, although a screen designer may successfully anticipate the size of each field when the text is displayed in English (e.g. the fields contain English text and widgets of predefined sizes), translation to a different language results in different sized text. For example, translation of the example spreadsheet shown in FIG. 1 to German requires different fields to completely view the text in German.

Currently, forms and spreadsheets attempt to overcome the field sizing problem through use of a scrollbar. For these spreadsheets, a scrollbar permits a user to scroll a field, in either a vertical or horizontal direction, to display additional text or graphics in the field. For the example spreadsheet shown in FIG. 1, a scrollbar may be provided to scroll in a horizontal direction to permit a user to read the entire text field. Although the scrollbars provide a means for a user to read an entire field, it requires the user, through use of a cursor control device, to select a field or cell, and to execute the scroll function by moving the scroll bar.

Other computer generated forms and spreadsheets permit resizing of a field by permitting a user to drag vertical or horizontal bars, which delineate adjacent fields, to extend the size of the field. Through use of the dragging technique, a user may resize one or more columns or rows to optimize a currently displayed screen. However, as the user scrolls through the form to display different rows, the size of the fields in the new rows of the form may not be optimal. Also, both methods discussed above are flawed because a user may not even realize that the full content of a cell is not visible. Therefore, it is desirable to provide a mechanism to optimize the sizing of fields for a form or spreadsheet that both maximizes the viewing of information on the form and requires minimal user interaction.

SUMMARY OF THE INVENTION

An auto sizing of fields system permits resizing a selected group of cells that are aligned on a computer generated form. In one embodiment, the cells are aligned in a column. Records include data that is displayed in the cells of the computer generated form. The data may include textual data or graphical objects. In one embodiment, the records are stored at remote data sources. To auto size a selected group of cells, a sampling of records that display data in the selected group of cells are selected. For each record selected, a display size is calculated based on the corresponding data. A display size is a size that is large enough to display, without obstruction, data from a record in the corresponding cell. From all of the display sizes calculated, a single optimal size for all cells in the group of cells is determined. Based on the optimal size, the group of cells are resized, and additional cells, which are visible on the computer generated form, are also resized or moved to reflect the resizing of the selected group of cells.

In one embodiment, the selected group of cells are aligned in a column, and the display size includes calculating a width of a cell. The width for each cell is calculated based on a predetermined fixed height and the size required to display data in a corresponding cell. To determine the optimal size, the width of each sampled record is compared to determine the largest width. For this embodiment, the optimal size is selected based on the largest width calculated. In addition, a predetermined minimum size, based on the display size of a description field for the group of cells, is specified. If the predetermined minimum size is greater than the largest display size of a sample record, then the predetermined minimum display size is selected for the optimal size. Furthermore, an input mechanism, such as a function on a pull down menu, permits a user to invoke the auto sizing function for the selected group of cells.

BRIEF DESCRIPTION OF THE DRAWINGS

FIG. 1 illustrates an example computer generated form for output on a computer display.

FIG. 3A illustrates an example spreadsheet display that includes an auto sizing function selectable from a menu bar.

FIG. 3B illustrates an example spreadsheet that displays a dialog box to enter column and/or sampling information.

DETAILED DESCRIPTION OF THE PREFERRED EMBODIMENTS

The auto sizing of fields system resizes selected groups of cells to optimize viewing of data on a computer displayed form. The selected group of cells are aligned on the form. For example, in one embodiment described below, the selected group of cells are aligned in a column on a form that includes rows and columns to form a matrix. The form is populated with data from records that may be stored at remote data sources. To auto size a selected group of cells, a sampling of records that display data in the selected group of cells are identified. For each record selected, a display size is calculated based on the corresponding data. A display size is a size that is is large enough to display, without obstruction, data from a record in the corresponding cell. From all of the display sizes calculated, a single optimal size for each cell in the group of cells is determined. Based on the optimal size, the group of cells are resized, and additional cells, which are visible on the computer generated form, are also resized or moved to reflect the resizing of the selected group of cells.

Figure 2:
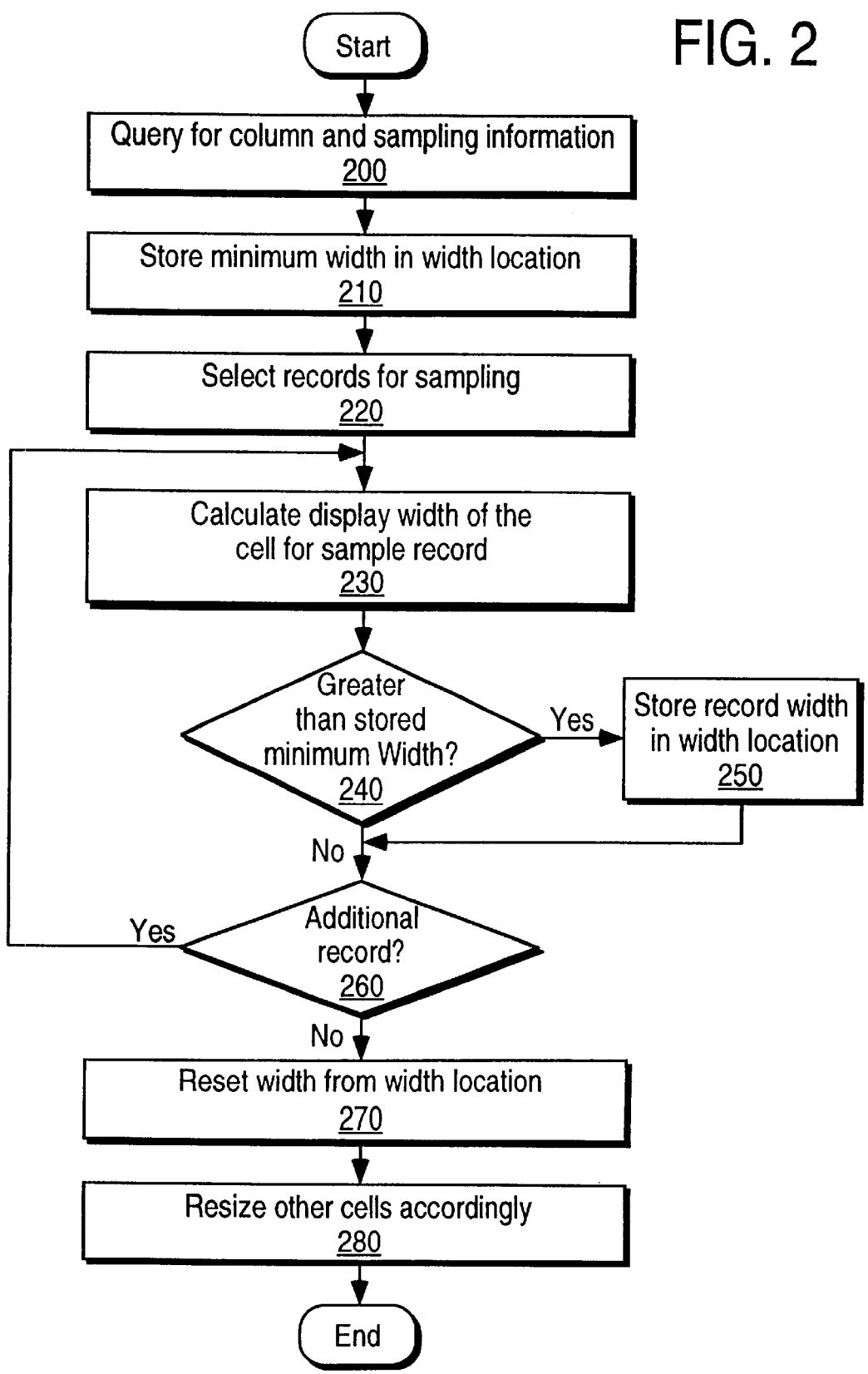
FIG. 2 is a flow diagram illustrating one method for auto sizing of fields on a computer generated form.

FIG. 2 is a flow diagram illustrating one embodiment for auto sizing of fields on a computer generated form. In one embodiment, the auto sizing of fields system adjusts the width of columns while maintaining a constant height for the row. Although the present invention is described in conjunction with adjusting the widths of columns on a computer generated form, the techniques described herein may be applied to the sizing of height for one or more selected rows and the sizing of both height and width for selected cells. As shown in block 200, the auto sizing of fields system queries the user for column and sampling information. The user specifies at least one column on the form for auto sizing. The selection of a column may be accomplished through any well known means including use of a cursor control device. As is described more fully below, the sampling information may include the number of records to sample, a statistical algorithm for identifying sample records, or specific records, such as records currently displayed on the output display.

In a software embodiment, the auto sizing of fields system utilizes a portion of computer system memory to store display sizes from sample records during the auto sizing calculation. For purposes of nomenclature, the memory portion is designated as the width location. For the embodiment shown in FIG. 2, a minimum width is stored in the width location as shown in block 220 of FIG. 2. In one embodiment, the minimum width for a selected column is the width required to display all of the text of the description field. For example, in the example spreadsheet of FIG. 1, if the "Order Handling Instructions" column was selected for resizing, then the minimum width for this column is the width required to display the entire text field "Order Handling Instructions." As shown in block 220, records are selected for sampling based on the sampling information. For example, if the sampling information indicates a statistical algorithm for random sampling, then a random or pseudo random technique is utilized to select records for sampling.

As is described more fully below, the auto sizing of fields system may be used in conjunction with a computer system that utilizes data residing in remote data sources. Thus, all data for display in a form, which may include thousands or millions of records, is not directly stored in the computer system memory. For the remote data source embodiment, data for each sample record is retrieved from a remote data source. As discussed above, data for a sample record may include text and/or widgets, such as check boxes and pop lists. For the example spreadsheet shown in FIG. 1, if the customer "Alpha" is the selected record and the column "Order Handling Instructions" is the selected column, then the text "Send immediate notification if in stock" is retrieved as the sample record data.

As shown in block 230 of FIG. 2, the display width of the cell for a sample record is calculated. The display width is the width required to fully display the text or widget in the corresponding cell. If the display width for a sample record is greater than the width stored in the width location, then the display width for the sample record is stored in the width location as shown in blocks 240 and 250. For the first sample record, the width location stores the minimum width. For each sample record, the width location stores the largest or greatest width of either the current or a previous sample record or the initial minimum width. If the display width of the sample record is not greater than the width in the width location, then the width location is not altered as shown in blocks 240 and 260. As shown in blocks 230, 240, 250 and 260, the process of comparing the display width for a sample record to the width stored in the width location is reiterated for each sample record. Consequently, after all sample records have been compared, the width location stores the width of either the largest display width from a sample record or the initially specified minimum width.

Based on the width stored in the width location, the width for the selected column is reset with the new width as shown in block 270. In addition to the selected column, widths from other cells displayed on the current screen are resized accordingly as shown in block 280. In one embodiment, to resize other fields displayed on the screen, the "X" or horizontal position of the left portion of the field in the selected column is not changed. The field in the adjacent column is positioned such that its' "X" or left most portion of the horizontal position is located at the "X" position of the prior adjacent field plus the width of the prior field. Similarly, this adjustment scheme is applied to all fields visible on the output display.

The auto sizing system described in conjunction with FIG. 2 stores the largest width required to fully display data from the sample records. In another embodiment, additional display widths are stored. For example, in one embodiment, all of the display widths for the sample records are stored. For this embodiment, the greatest amount of flexibility is provided for optimizing the size of all of the selected column. If all of the display sizes (e.g., widths) for each sample record are stored, then statistical algorithms may be executed to select the optimal width. For example, if the selected column contains records that display 500 characters, and the average record for that column includes only 30 characters, then setting a column width to display 30 characters may be desirable. For this example, a user is required to scroll through the field that displays the 500 characters to read all 500 characters. However, if all of the widths for the column are set to a size to accommodate the 500 characters, then less columns are displayed, and a large sacrifice results to accommodate a single record. Accordingly, when additional display widths of sample records are stored, the auto sizing system may implement algorithms to optimize the width size of a selected column.

As discussed above, for each sample record, the display width is calculated. In one embodiment, if the sample record displays text, then the text is applied to a matrix of the prompt to determine the maximum width required to display the text. If the data object includes graphics, such as a check box, then the display width is calculated by applying the matrix of the prompt plus the width of the check box widget itself. Similarly, display widths for other types of graphical objects are calculated based on the width of the object.

The auto sizing of fields system of the present invention permits optimizing screen displays of forms and spreadsheets. The designer of a static form may specify a field width that is larger or smaller than required to display the data. If the fields of a column on a form are too large, then the number of columns that may be viewed in a single screen are limited. Because the width sizes for selected columns are based on widths of actual sample records, the auto sizing of fields system maximizes the amount of data visible on a single screen. Alternatively, in a static design paradigm, if the fields of a column are too small, then a user mechanism, such as a scroll bar, is required to view entire data fields. With scrolling, a user is prevented from quickly viewing the data. Furthermore, if an application permits resizing without knowledge of display widths from some or all of the records, then it may not be apparent that some data is not visible because the user would resize the column while only viewing a subset of the total number of records. For example, a user may incorrectly interpret a blank space in a data field as the end of the data when more data remains in that field. The auto sizing of fields system of the present invention permits viewing, in most circumstances, all of the data in an auto sized column. Therefore, the user is not required to intervene, such as through execution of a scroll operation, to visualize all of the data. Consequently, the shortcomings of static screen sizes, even those incorporating scroll bars, are overcome in the auto sizing system of the present invention such that if a statically set width is too large or too small for a column, then the auto sizing of fields system narrows or widens, respectively, the column width to an optimal size.

In one embodiment, the auto-sizing function of the present invention is invoked by a user through selection of an input mechanism. FIG. 3A illustrates an example spreadsheet display that includes an auto sizing function selectable from a menu bar. For the embodiment shown in FIG. 3A, the auto sizing function is invoked through use of an "auto size" function selectable from the menu bar. Although the auto size function is shown selectable from a menu bar, the auto sizing function may be selected through any of the well known input mechanisms utilized in graphical user interfaces (GUIs). For example, the auto sizing function may be selected through use of a button displayed anywhere on the output display. Furthermore, the auto sizing function may be invoked through a predetermined keyboard input sequence (e.g. a keystroke sequence). A cursor control device, such as a mouse, may also be used to invoke the auto sizing function through either the menu bar (FIG. 3A) or by placing the cursor on a selected column and by depressing buttons on the cursor control device. The selection of the auto sizing function may be accomplished through any well known means without deviating from the spirit and scope of the invention.

FIG. 3B illustrates an example spreadsheet that displays a dialog box to enter column and/or sampling information. In one embodiment, a dialog box is displayed upon invocation of the auto sizing function. The dialog box provides a user the means to enter sampling information and to select a column. For example, a user may enter information to sample data from the current screen. The user may also request a random sampling of records. A user may further specify a number of rows for sampling. For example, if a form or spreadsheet includes 10,000 records (e.g. 10,000 rows in the spreadsheet), and a user specifies a sampling number of 100, then the auto sizing of field system samples every tenth row to determine the optimal sizing of the selected column. Although selecting a large number of rows results in a more optimal display of data, a time delay occurs if the computer system operates in a remote data source environment due to the time required to access the remote data sources.

Figures 3C, 4:
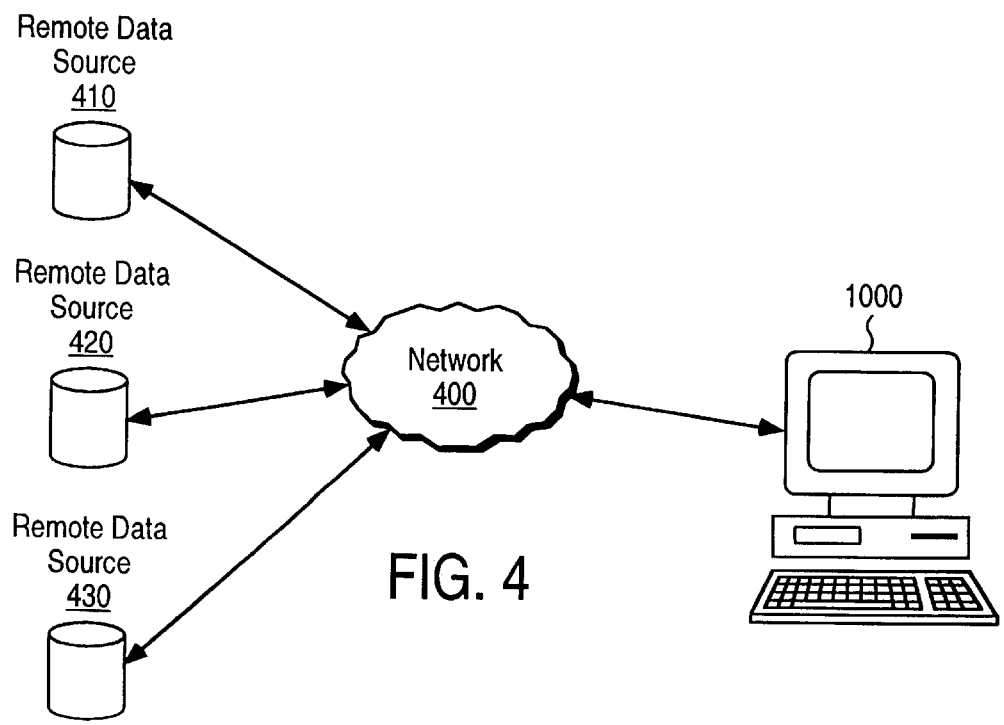
FIG. 3C illustrates an example computer display after auto sizing.
FIG. 4 illustrates a network that includes remote data sources.

FIG. 3C illustrates an example computer display after execution of the auto sizing function. The screen display illustrated in FIG. 3C corresponds to the example spreadsheet illustrated in FIG. 3A. As shown in FIG. 3A, the user selected the first column entitled "Order Handling Instructions." In addition, for this example, the user specified the first record, customer name "Alpha", as a record for sampling. As shown in FIG. 3C, after executing the auto sizing function, the text for all records in the "Order Handling Instructions" column is visible. For the "Alpha" record, the text "Send immediate notification if in stock" is visible on the display. For a random sampling of a relatively large number of records, data for most cells is visible.

The auto sizing of field system of the present invention has application for use in software applications that utilize remote data sources. FIG. 4 illustrates a network that includes remote data sources. A computer system 1000, that includes the auto sizing of fields system of the present invention, is coupled to a network 400. The network 400 may include a local area network (LAN) and/or a wide area network (WAN) for accessing one or more data sources. Furthermore, the network 400 includes network access and control devices (not shown), such as servers, routers and switches, to transmit data. A plurality of remote data sources, labeled 410, 420 and 430 on FIG. 4, are coupled to the network 400. In a large system, the remote data sources may physically consist of several different devices at different locations. The remote data sources provide data to one or more clients, such as the computer system 1000. The network shown in FIG. 4, including the remote data sources, is intended to represent a broad category of systems used to connect a data recipient, such as a computer system, to one or more data sources, which are well known in the art and will not be described further.

As discussed above, after invocation of the auto sizing function of the present invention, the computer system 1000, under control of auto sizing of fields system software, selects specified records stored on the remote data sources (410, 420 and 430) via the network 400. For the records selected, the auto sizing of fields software specifies the matrix parameters, including the font, to a network access device, such as a server. In response, the size of the fields are calculated remotely (e.g. the data for a selected record is not retrieved to the computer system 100), and a number, representing the width of the field required to fully render the data, is returned to the computer system 1000. For the remote data source application, it is not practical for the computer system 1000 to retrieve records for thousands or even millions of records stored on the various remote data sources. Thus, a sampling of records that return a width calculation results in the most efficient and optimal determination of display sizes for remote data source applications.

Figure 5:
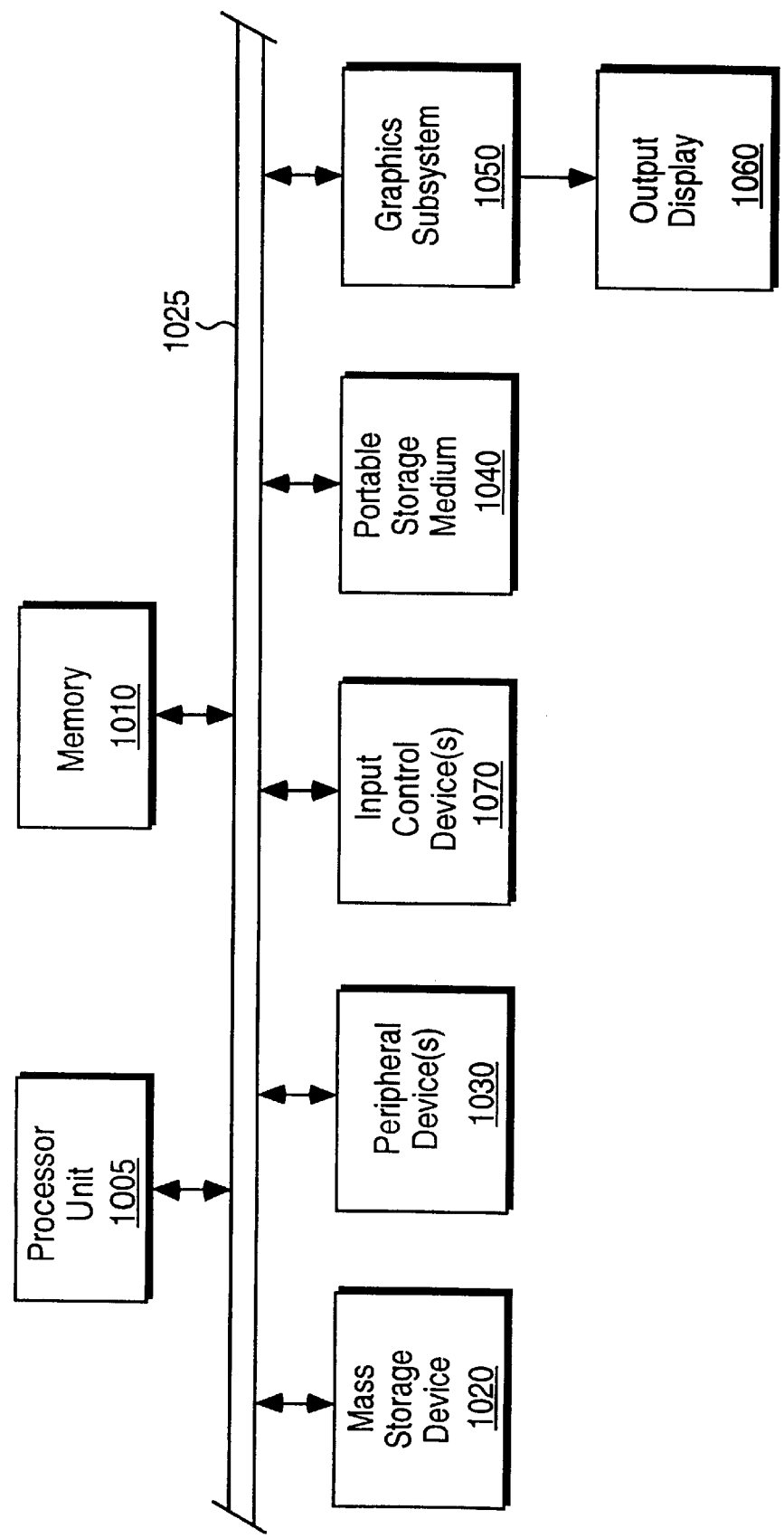
FIG. 5 illustrates a high level block diagram of a general purpose computer system in which the auto sizing of fields system of the present invention may be implemented.

FIG. 5 illustrates a high level block diagram of a general purpose computer system in which the auto sizing of fields system of the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the auto sizing of fields system of the present invention is wholly or partially implemented in software, the main memory 1010 stores the executable code when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 5 as being connected via the bus 1025. However, the computer system 1000 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may be implemented with a magnetic disk drive or an optical disk drive, is a non-volatile storage device for storing data and instructions for use by the processor unit 1005. In the software embodiment, the mass storage device 1020 stores the auto sizing of fields system software for loading to the main memory 1010.

The portable storage medium drive 1040 operates in conjunction with a portable non-volatile storage medium, such as a floppy disk or a compact disc read only memory (CD-ROM), to input and output data and code to and from the computer system 1000. In one embodiment, the auto sizing of fields system software is stored on such a portable medium, and it is input to the computer system 1000 via the portable storage medium drive 1040. The peripheral device (s) 1030 may include any type of computer support device, such as an input/output (I/O) interface, to add additional functionality to the computer system 1000. For example, the peripheral device(s) 1030 may include a network interface card for interfacing the computer system 1000 to the network 400 (FIG. 4) for the remote data source application.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, stylus, or cursor direction keys. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The components contained in the computer system 1000 are those typically found in general purpose computer systems, and in fact, these components are intended to represent a broad category of such computer components that are well known in the art.

The auto sizing of fields system may be implemented in either hardware or software. For the software implementation, the auto sizing of fields system is software that includes a plurality of computer executable instructions for implementation on a general purpose computer system. Prior to loading into a general purpose computer system, the auto sizing of fields system software may reside as encoded information on a computer readable medium, such as a magnetic floppy disk, magnetic tape, and compact disc read only memory (CD-ROM). In one hardware implementation, the auto sizing of fields system may comprise a dedicated processor including processor instructions for performing the functions described herein. Circuits may also be developed to perform the functions described herein.

Although the present invention has been described in terms of specific exemplary embodiments, it will be appreciated that various modifications and alterations might be made by those skilled in the art without departing from the spirit and scope of the invention as set forth in the following claims

What is claimed is:

1. A method for configuring cell sizes of a computer generated form to optimize display of data from a persistent data source, said method comprising the steps of:

accessing a persistent datastore to read a sample of records from a database, said sample of records being less than the total number of records in said database and said sample of records being selected, through a statistical algorithm, so as to generally represent all of said records in said database, said database stores data for a plurality of cells for display as a computer generated form, said data for each record comprising a length;

determining a single optimal size from said length of data in said sample of records to display said data on said computer generated form; and thereafter, rendering said computer generated form on an output display with data from said records displayed in said cells sized to said optimal size, whereby said computer generated form is optimized based on data in said sample of records.

2. The method as set forth in claim 1, wherein the step of determining a single optimal size comprises the steps of:

calculating a plurality of display sizes from said length of data in said sample of records, wherein a display size comprises a size large enough to display, without obstruction, data in a corresponding cell;

comparing said display sizes from each record sampled to determine a largest display size; and selecting for said single optimal size said largest display size.

3. The method as set forth in claim 2, further comprising the steps of:

selecting a predetermined minimum size; and selecting for said single optimal size said predetermined minimum size if said predetermined minimum size is greater than said largest display size.

4. The method as set forth in claim 1, wherein said cells are aligned in a column on said computer generated form.

5. The method as set forth in claim 1, wherein the step of determining a single optimal size comprises the step of calculating a width, based on a predetermined height, to display data in a corresponding cell.

6. The method as set forth in claim 1, wherein said data for display in said cells comprises textual data.

7. The method as set forth in claim 1, wherein said data for display in said cells comprises widgets.

8. The method as set forth in claim 1, further comprising the steps of:

providing an input mechanism that permits a user to select at least one group of cells and to select a resizing function; and resizing said group of cells selected in response to user selection of said resizing function from said input mechanism.

9. The method as set forth in claim 1, wherein said database of records are stored in a remote persistent datastore.

10. A computer readable medium having a set of instructions stored therein, which when executed by a computer, causes the computer to configure cell sizes of a computer generated form to optimize display of data from a persistent data source, by performing the steps of:

accessing a persistent datastore to read a sample of records from a database, said sample of records being less than the total number of records in said database and said sample of records being selected, through a statistical algorithm, so as to generally represent all of said records in said database, said database stores data for a plurality of cells for display as a computer generated form, said data for each record comprising a length;

determining a single optimal size from said length of data in said sample of records to display said data on said computer generated form; and thereafter, rendering said computer generated form on an output display with data from said records displayed in said cells sized to said optimal size, whereby said computer generated form is optimized based on data in said sample of records.

11. The computer readable medium as set forth in claim 10, wherein the step of determining a single optimal size comprises the steps of:

calculating a plurality of display sizes from said length of data in said sample of records, wherein a display size comprises a size large enough to display, without obstruction, data in a corresponding cell;

comparing said display sizes from each record sampled to determine a largest display size; and selecting for said single optimal size said largest display size.

12. The computer readable medium as set forth in claim 11, further comprising the steps of:

selecting a predetermined minimum size; and selecting for said single optimal size said predetermined minimum size if said predetermined minimum size is greater than said largest display size.

13. The computer readable medium as set forth in claim 10, wherein said cells are aligned in a column on said computer generated form.

14. The computer readable medium as set forth in claim 10, wherein the step of determining a single optimal size comprises the step of calculating a width, based on a predetermined height, to display data in a corresponding cell.

15. The computer readable medium as set forth in claim 10, wherein said data for display in said cells comprises textual data.

16. The computer readable medium as set forth in claim 10, wherein said data for display in said cells comprises widgets.

17. The computer readable medium as set forth in claim 10, further comprising the steps of:

providing an input mechanism that permits a user to select at least one group of cells and to select a resizing function; and resizing said group of cells selected in response to user selection of said resizing function from said input mechanism.

18. The computer readable medium as set forth in claim 10, wherein said database of records are stored in a remote persistent datastore.

19. A computer system comprising:

a persistent datastore for storing a database of a plurality of records of data for display within cells on a computer generated form, said data for each record comprising a length;

processor unit for accessing said persistent datastore to read a sample of records from said database, said sample of records being less than the total number of records in said database and said sample of records being selected, through a statistical algorithm, so as to generally represent all of said records in said database, and for determining a single optimal size from said length of data in said sample of records to display said data on said computer generated form; and an output display for displaying said computer generated form with data from said records displayed in said cells sized to said optimal size, whereby said computer generated form is optimized based on data in said sample of records.

* * * * *